(12) United States Patent
Joseph et al.

(10) Patent No.: US 7,693,049 B2
(45) Date of Patent: Apr. 6, 2010

(54) SELF-ORGANIZATION OF SENSOR NETWORKS USING ANT COLONY OPTIMIZATION

(75) Inventors: Sindhu Joseph, Wayanad (IN); Ashwin Kumar, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 1015 days.

(21) Appl. No.: 10/977,572

(22) Filed: Oct. 29, 2004

(65) Prior Publication Data

US 2006/0092913 A1 May 4, 2006

(51) Int. Cl.
*G01R 31/08* (2006.01)
(52) U.S. Cl. ........................... 370/229; 370/252
(58) Field of Classification Search ................. None
See application file for complete search history.

(56) References Cited

U.S. PATENT DOCUMENTS

| | | | | |
|---|---|---|---|---|
| 7,116,643 | B2 * | 10/2006 | Huang et al. | 370/255 |
| 7,176,808 | B1 * | 2/2007 | Broad et al. | 340/870.07 |
| 7,466,655 | B1 * | 12/2008 | Zhao | 370/238 |
| 2003/0063585 | A1 * | 4/2003 | Younis et al. | 370/331 |
| 2003/0202479 | A1 * | 10/2003 | Huang et al. | 370/252 |
| 2004/0032831 | A1 * | 2/2004 | Matthews | 370/238 |
| 2005/0083858 | A1 * | 4/2005 | Loa et al. | 370/254 |
| 2006/0056302 | A1 * | 3/2006 | Ahn et al. | 370/238 |

OTHER PUBLICATIONS

Iyengar, S.S. Hsiao-Chun Wu Balakrishnan, N. Shih Yu Chang, Biologically Inspired Cooperative Routing for Wireless Mobile Sensor Networks, Sep. 2007, IEEE, IEEE Systems Journal, vol. 1, Issue: 1, pp. 29-37.*

Guntsch, Michael, et al., "Pheromone Modification Strategies for Ant Algorithms Applied to Dynamic TSP", *Lecture Notes in Computer Science*, vol. 2037/2001, (2001),213-222.

Intanagonwiwat, Chalermek, et al., "Directed diffusion: a scalable and robust communication paradigm for sensor networks", *MobiCom '00: Proceedings of the 6th Annual International Conference on Mobile Computing and Networking*, (2000),56-67.

Kassabalidis, I., et al., "Swarm intelligence for routing in communication networks", *IEEE Global Telecommunications Conference, 2001. GLOBECOM '01.*, vol. 6,(2001),3613-3617.

Pirolli, Peter, "Information Foraging & Information Scent: Theory, Models, and Applications", *Xerox Palo Alto Research Center—PARC*, (2001),1-71.

Subing, Zhang, et al., "A QoS routing algorithm based on ant algorithm", *25th Annual IEEE Conference on Local Computer Networks, 2000. LCN 2000. Proceedings.*, (2000),574-578.

* cited by examiner

*Primary Examiner*—Jayanti K Patel
*Assistant Examiner*—Hooman Houshmand
(74) *Attorney, Agent, or Firm*—Schwegman, Lundberg and Woessner P.A.

(57) ABSTRACT

A system and a method for organizing optimal paths in a sensor network. Optimal paths are determined based on an objective function that balances the performance and energy consumption of sensor nodes. Each sensor node stores and updates pheromone values and aging factors associated with each of its neighbor nodes. The pheromone values provide an indication of the speed of a given path, while the aging factor represents the use. Paths are compared using these variables and an optimal path is selected on each transfer so that the load is spread across a variety of sensor nodes, increasing network life.

36 Claims, 7 Drawing Sheets

SELF-ORGANIZATION OF SENSOR NETWORKS USING ANT COLONY OPTIMIZATION

BACKGROUND

Large scale, dynamically changing sensor networks are used for remote sensing and decision making in pervasive environments like industrial plants, aircraft interiors, battlefields, houses and commercial establishments. Such systems require consistently high performance over a long period in order to avoid costs associated with maintenance. Hence, features like miniaturization, optimal power consumption, data processing capability using minimal resources and adaptability are essential features of sensors used in smart sensor networks.

The exact demands of such a network vary with each scenario in which the network operates based on functionality and usage. The sensors may be dedicated in performing a specific function continuously over long periods of time, e.g. temperature sensors, sound sensors, etc. Or the sensors may be multi-modal sensors, capable of sensing multiple data types, e.g. an integrated sensor for temperature, sound, and humidity. These sensors may be queried either for continuous monitoring or for a specific service request. The arrangement of the sensor network also plays a role in network requirements. While some networks may be organized and systematic, this cannot be assumed. Many sensor networks may be deployed in a seemingly random fashion near the event to be observed. Also, the topology of the sensor network may be subjected to frequent changes, due to removal or addition of sensor nodes and relocation of sub-networks. The environment in which the network is deployed will greatly determine the amount of maintenance available, with repairs in hostile environments being very costly. In such scenarios, the sensor network lifespan has to be maximized using methods for self-organization, power aware communication, and co-operative data processing.

One current approach to a self-organizing network is based on an ant-algorithm. This method is modeled on the observed behavior of ants in finding the best path, e.g. to a food source. The ants make decisions as to which way to travel based on pheromones left by other ants. Thus, a more traveled path is reinforced as more and more ants choose that path. At the same time, longer paths will be used less and less, and the pheromone will ultimately evaporate. The eventual path will consistently be the best, because shorter paths are traveled more frequently in the constant coming and going of a large number of ants. In order to implement such a system in a sensor network, message carriers deposit markers as they are passed along the network. Paths containing these markers are more likely to be chosen by later carriers, and thus are reinforced over time as more markers are deposited. In this way the best path is eventually chosen. In a trained sensor network, this generally results in a fast response to any request for information.

Directed diffusion is a similar approach. The method involves spreading interests for named data across a network. As this is done, gradients are established within the network between nodes. Each gradient is a connection between nodes at a given transmission rate. Initially, the rate is relatively low. Paths that deliver an event first are reinforced by creating high data rate transmissions between nodes in the path.

These solutions to sensor network organization have the disadvantage of overburdening particular portions of the network. Because the same path is being used consistently, those sensors in that path are likely to die out well before other sensors. When these sensors fail, the efficiency of communication across the entire network may degrade. This may result in either unsatisfactory performance or the need to perform costly repairs, possibly replacing large portions of the network. Thus, there is a need for sensor networks that can more effectively balance the factors of performance and sensor life.

SUMMARY

In one example embodiment, a message is received. A pheromone value and an aging factor associated with the message are updated. The message is then transmitted.

In a further embodiment, a method implemented by a node in a network of nodes for organizing the network, involves scanning for at least one neighbor node. At least one pheromone value and at least one aging factor associated with the scanned at least one neighbor node is then updated.

In yet a further embodiment, a node stores at least one pheromone value and at least one aging factor. Messages are received, and transmitted.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

Figure 1:
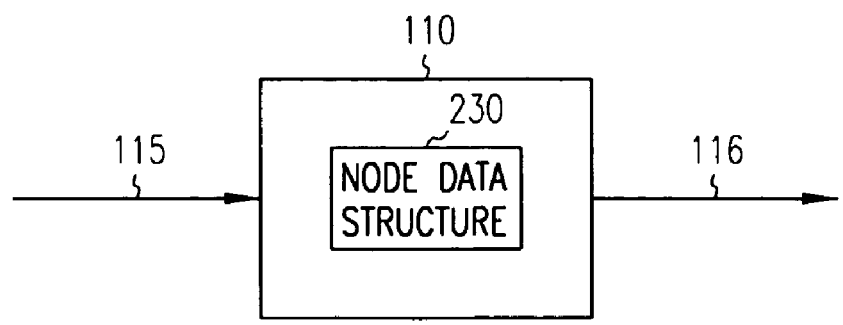
FIG. 1 is a block diagram showing a single sensor node according to an example embodiment.

FIG. 1 shows a block diagram of a single sensor node 110 in its simplest form. The sensor node receives a message 115. Following this, the sensor node updates a pheromone value and aging factor, stored in the node data structure 230. An empty node data structure is shown in table 1.

TABLE 1

| Interest (I) | Neighbor Node (N) | Pheromone Value (P) | Aging Factor (A) |
|---|---|---|---|
| $I_1$ | | | |
| $I_2$ | | | |
| $I_n$ | | | |

The node data structure contains a list of interests. As can be seen, there can be any number of interests, here labeled $I_1$ through $I_n$. Each interest specifies a particular type of data, such as temperature, pressure or sound data. An interest may specify a sensor node or group of sensor nodes within a network from which the data is requested. For example, in a traffic sensor network, interest $I_i$ may specify motion data is required from a particular intersection. Interests are added into each sensor node's memory before being placed in the network, and the list of interests is static during network operation. Each interest is associated with a list of tuples that changes as the network evolves. Each tuple contains a neighbor node, pheromone value, and aging factor. Initially the list of tuples for a sensor node is empty. As messages are sent and received by the sensor node, it adds tuples for each neighbor node and modifies them based on use. When the node data structure is initialized, each of these interests may have multiple tuples associated with it.

Returning to FIG. 1, after this message has been received and the node data structure has been updated, the sensor node forwards on message 116. Message 116 may be equivalent to message 115, or it may be a different message. In a sensor network, a message is generally either a request for information or a reply with information. However, as discussed below, other types of messages may be transferred in other embodiments.

Figure 2:
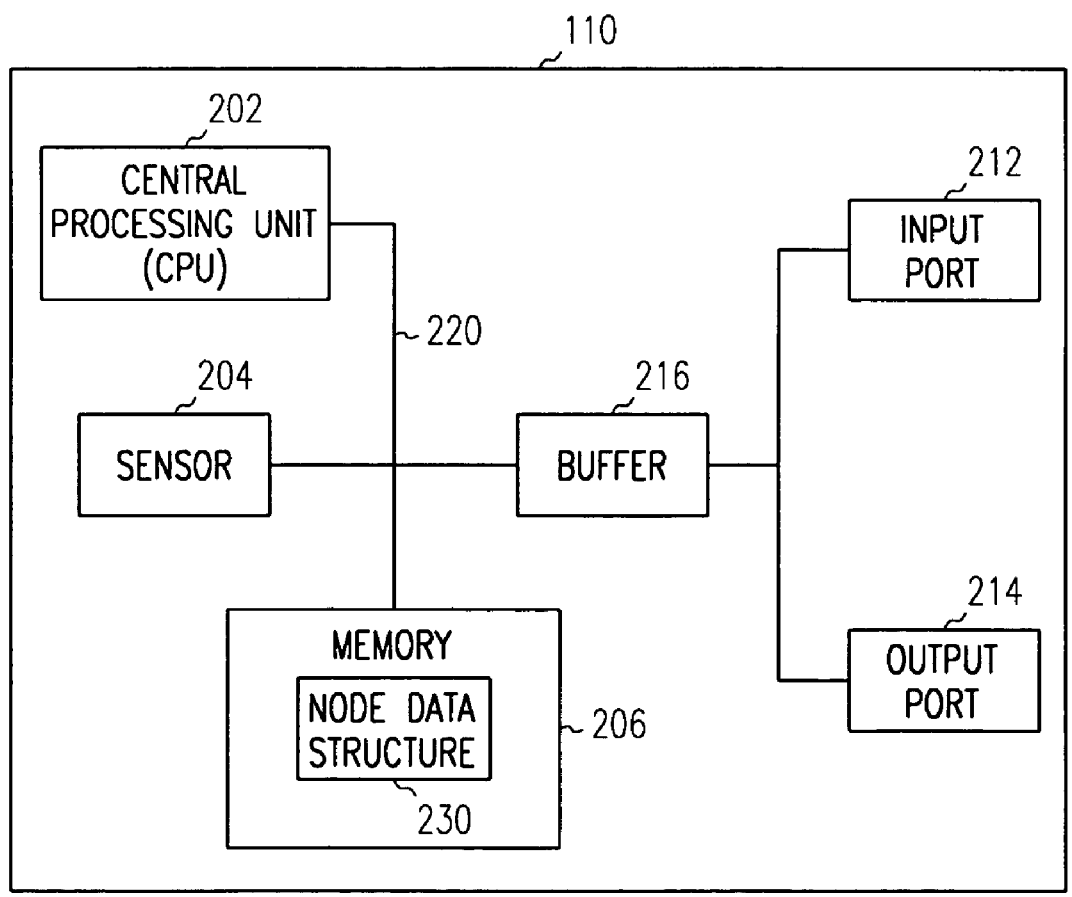
FIG. 2 is a block diagram showing the computer environment of a sensor node according to an example embodiment.

FIG. 2 shows a block diagram of the simplified computer structure of a sensor node 110. Messages are received via input port 212 and carried through buffer 216 over data bus 220. The sensor contains a CPU 202 that processes any received message, and determines where to transmit a message in response. The CPU does this by analyzing the node data structure 230 in the memory block 206. Depending on the message received, the sensor node may transmit a message containing sensor data. The sensor node contains at least one sensor device 204 that collects such data. Though not shown in this figure, the sensor node could contain a plurality of sensor devices, each capable of detecting different events. In another embodiment, the sensor node may have no sensor device 204, in which case it acts solely to transmit messages and not to collect data. After determining the message to send and its target, the outgoing message is transmitted through output port 214. Input port 212 and output port 214 are shown as separate components, however, in another embodiment they are included in a single I/O port. In one embodiment, sensor node 110 is connected to other devices through input port 212 and output port 214 over a wireless network.

Figure 3:
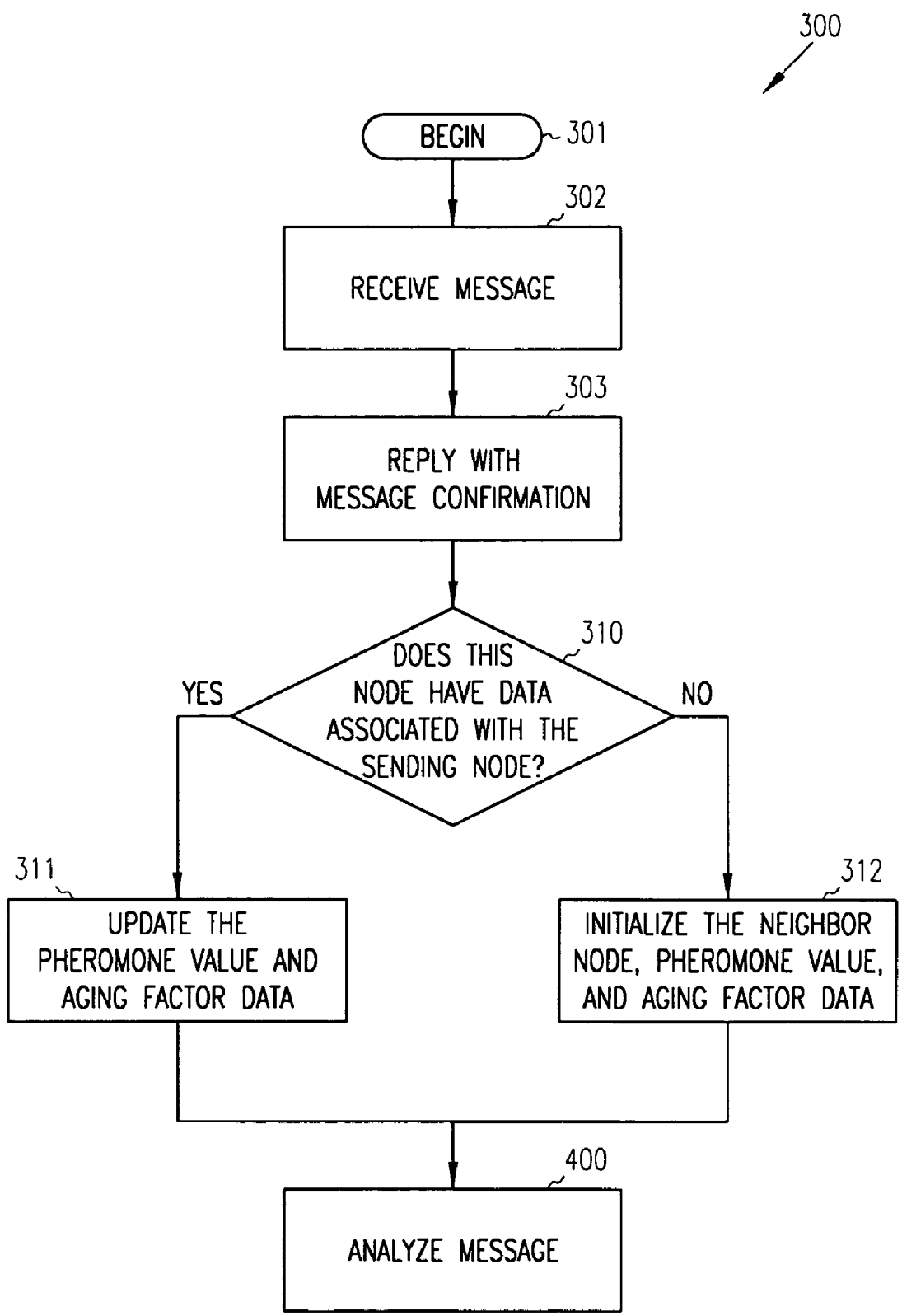
FIG. 3 is a flow chart showing the steps taken by a sensor node receiving a message according to an example embodiment.

FIG. 3 shows a flow chart diagramming process 300 performed by a sensor node of an embodiment of the current invention. The sensor node exists in a network of similar devices. Beginning at start block 301, the sensor is waiting for some activity. This activity takes the form of receiving a message, shown in block 302. The first action taken by the sensor node upon receiving the message is to reply to the sender of the message, another sensor node in the network, as shown in block 303. The reply may take many forms but contains enough information so that the sender can determine the sensor node that sent the reply and in response to which message. Using this information, the sender will update its own node data structure.

Continuing with the diagram, block 310 tests whether the sensor node currently has any stored data associated with the sender. The message will be associated with a given interest $I_i$. The sensor node checks the node data structure for data associated with this interest. This data may be in the form of a tuple containing a label for the neighbor node, a pheromone value and an aging factor. The sensor node determines if a tuple exists having the sender as its neighbor node. If the sensor node does have such data, the system proceeds to block 311. If not, the system proceeds to block 312.

If the sensor node already had data associated with the sender the sensor node updates that data. The use of this path suggests that it may be superior to others, and so the pheromone value is increased. This is conceptualized as an ant leaving traces of a pheromone as it travels a path, reinforcing the path as it goes. The pheromone value ($P_i$) for the given interest is increased according to the function:

$$P_i = (1+\rho)P_i \tag{1}$$

Here $\rho$ is a constant, the evaporation rate. A typical value for $\rho$ is 0.3, though an appropriate value will depend on the exact characteristics of the sensor node network.

At the same time, the aging factor is incremented. In one embodiment the aging factor is incremented for the data associated with just the given interest $I_i$. In another embodiment the aging factor is incremented for that sensor node across every interest in the node data structure.

Returning to block 310, if the data is not present, it is updated by initializing the data at block 312. A new tuple is created for the given interest. The tuple contains the neighbor node, a pheromone value and an aging factor. The pheromone value is initialized to 1/t, where t is the response time over the path between the sensor nodes. The aging factor is initialized to 1.

The node data structure now contains an up to date tuple for the sending node. Having completed this step, the sensor node analyzes the message in block 400.

Figure 4:
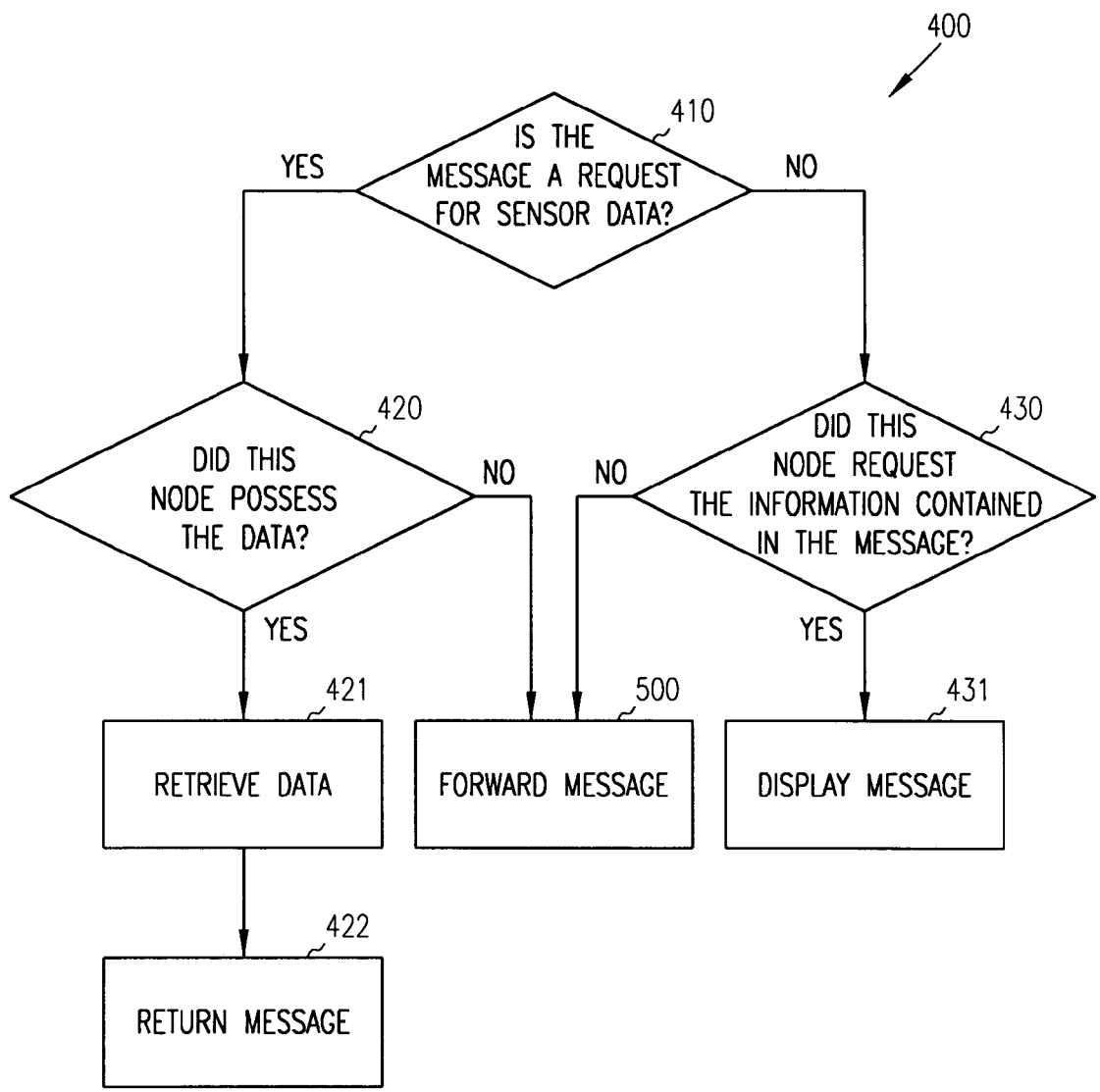
FIG. 4 is a flow chart showing the steps taken by a sensor node determining what action to take with a received message according to an example embodiment.

FIG. 4 shows a flow chart corresponding to the steps taken at block 400. Beginning in block 410, the sensor node determines if the received message is a request for sensor data. If it is a request then the sensor node proceeds to block 420. If it is not a request, then the message is some kind of data, and the sensor node proceeds to block 430.

If the message is a request for sensor data, then at block 420 the sensor node determines if the sensor node possesses the requested information. If the sensor node does, it retrieves the data in block 421 and then returns the new message to the appropriate neighbor node at block 422. If the sensor node does not possess the requested information, then it propagates the message through the network according to the steps of block 500.

Returning to block 410, if the message is not a request for sensor data the sensor node proceeds to block 430. Since the message is not a request, but rather information, the sensor node determines at block 430 whether or not the information contained in the message was requested by the sensor node. If not, then the message is forwarded according to block 500. If the data was requested by the sensor node, the message is displayed at block 431.

Figure 5:
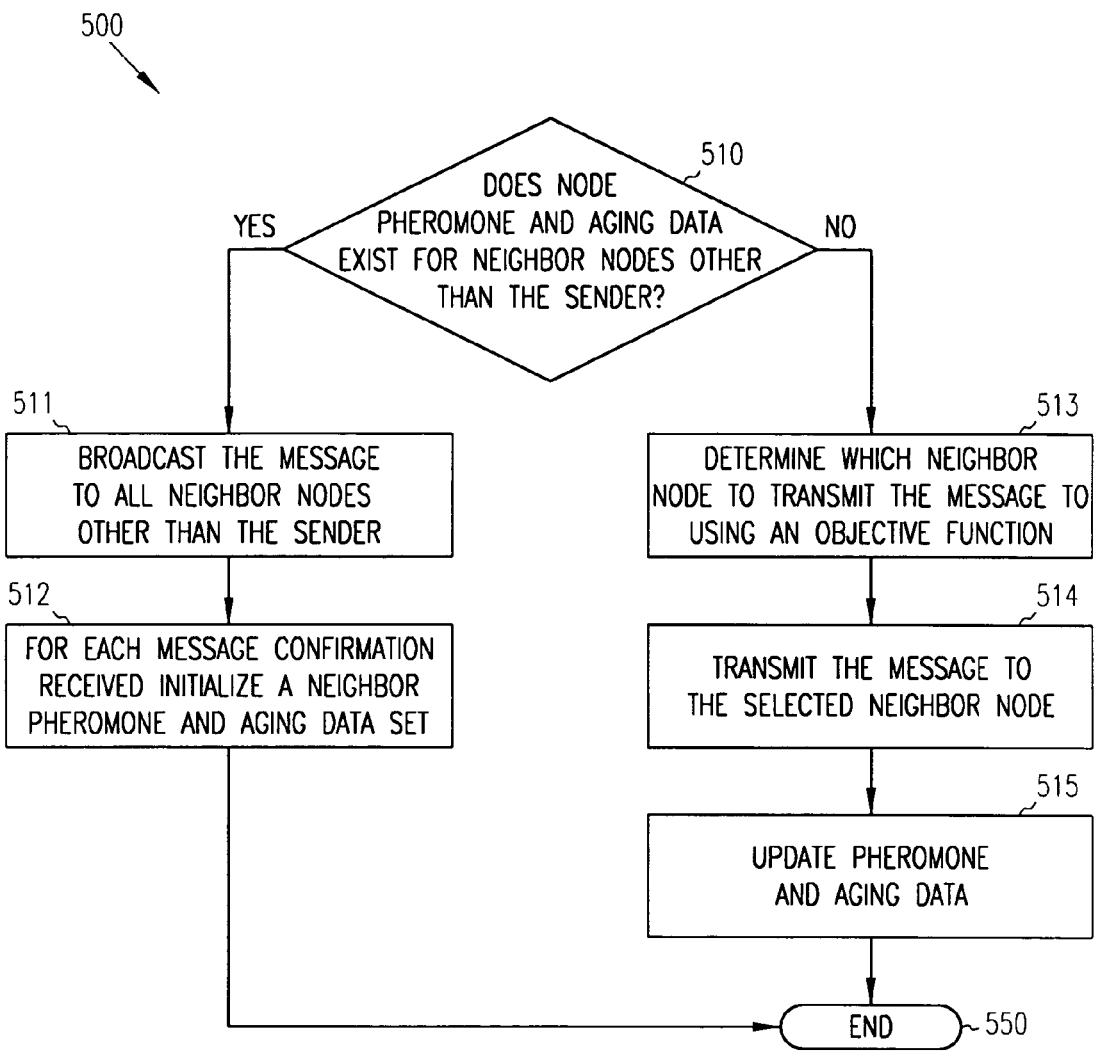
FIG. 5 is a flow chart showing the steps taken by a sensor node determining which neighbor nodes to transmit to according to an example embodiment.

FIG. 5 is a block diagram showing the steps performed at block 500. Starting at block 510, the sensor node determines if node, pheromone and aging data exists for the given interest. The newly initialized or updated data for the sender is not included in this process. If no such data exists the sensor node will need to find neighbor nodes and add the appropriate data to the node data structure. In this case the process proceeds to block 511. If the information already exists for the given interest the process goes to block 513.

At block 511 the sensor node broadcasts the message to each of its neighbor nodes, excepting the node it received the message from. The sensor node then goes to block 512. Each neighbor node will receive the message and proceed to propagate the message through the network in the same fashion. When a neighbor node reaches block 303, it will send a confirmation back to the sensor node. At block 512 the sensor node receives these confirmations, and updates its node data structure accordingly. For each neighbor node that sends a reply, a tuple is created for the given interest containing the neighbor node, an initial pheromone value and an initial aging factor. The pheromone value is initialized for each tuple according to the response time over the path as described by equation (1) at block 312. The aging factor is initialized to 1. Having now initialized the data structure for the given interest and having sent the message on through the network, the sensor node proceeds to end block 550 and waits for another message.

If node, pheromone and aging data existed at block 510 the sensor node proceeds to block 513. The sensor node then determines, based on the stored data, which node to transmit the message to. This is done using an objective function. The function balances the speed of a path against the amount of use that path receives. One such function is:

$$X = \alpha f(P) + \beta \frac{1}{A} \quad (2)$$

Here $\alpha$ and $\beta$ are constants whose values are chosen based on the particular sensor network. A is the aging factor, and f(P) is a function of the pheromone value. As the pheromone value increases, f(P) increases, and hence the value of the objective function, X, increases. Thus a faster path initialized with a higher pheromone value will produce a larger objective function value. However, as the aging factor increases, X decreases. Thus, the larger the aging factor, the smaller the objective function value for a particular path. The path chosen by the sensor node at block 513 is the path that corresponds to the largest value of X for the given interest.

Having determined the optimal path in block 513, the sensor node transmits the message to the selected neighbor node in block 514. Thus, once the sensor node has trained its node data structure it does not need to broadcast a message to every neighbor node in order to effectively propagate the message through the network.

At block 515 the sensor node updates its node data structure by updating the pheromone and aging data corresponding to the given interest and neighbor node. The pheromone value is updated according to equation (1) above, and the aging factor is incremented. After updating these values the process ends at block 550 with the sensor node again waiting for a new message.

Figure 6A:
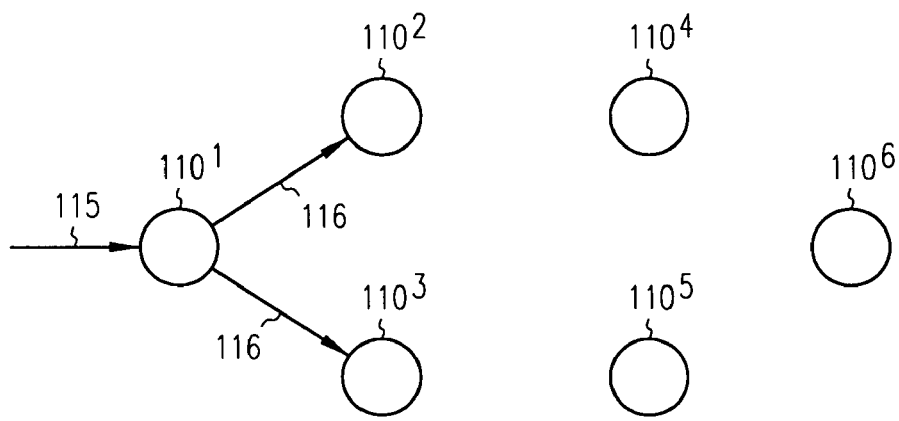
FIGS. 6A, 6B and 6C are illustrations of a request for information propagating through the network according to an example embodiment.
Figure 6B:
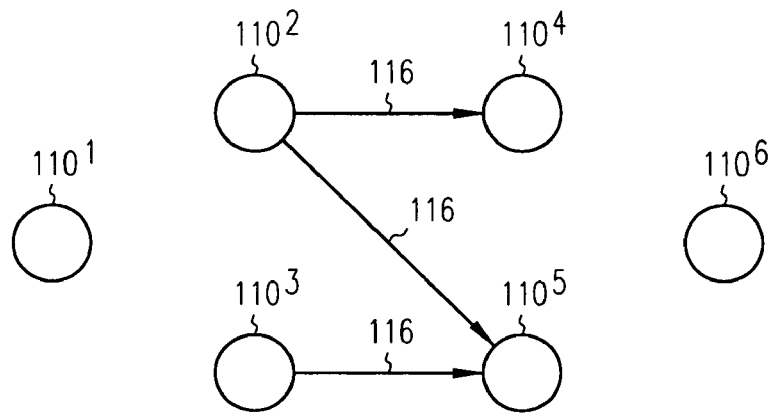
Figure 6C:
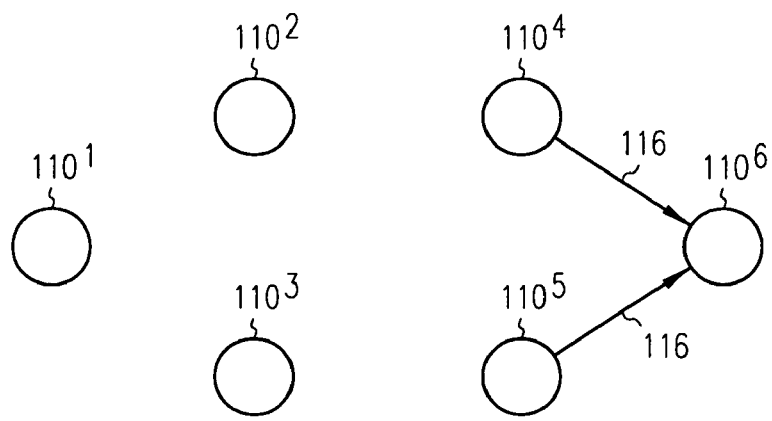

FIGS. 6A, 6B and 6C show an example of a request for information being propagated through a simple network using the process outlined above. The network contains six sensor nodes labeled $110^1$ through $110^6$. The sensor nodes communicate with their neighbor nodes via a wireless network.

Starting at FIG. 6A, a message 115 is received by sensor node $110^1$. The message is a request for information associated with an interest $I_1$, e.g. a request for temperature data. The data associated with this interest is available at sensor node $110^6$.

Message 115 may have been broadcast by another node or it may have been entered into sensor node $110^1$ by an operator. If the message was sent by another node, sensor node $110^1$ will send a reply and update its node data structure accordingly. In this embodiment, the message is a request for information entered into sensor node $110^1$ by a user, so that sensor node $110^1$ does not update data in its node data structure at this time. In the embodiment described here, sensor node $110^1$ is considered a sink node because it is requesting the sensor data. In another embodiment the request is generated automatically and periodically at sensor node Sensor node $110^1$ receives the message and determines that the message is a request for information. Sensor node $110^1$ does not possess that information, and therefore must forward the message on.

Sensor node $110^1$ does not have any data associated with interest $I_1$, so it must broadcast the message to all of its neighbor nodes. The neighbor nodes are sensor node $110^2$ and sensor node $110^3$. Sensor node $110^1$ broadcasts message 116, which is received by each of these neighbor nodes. The neighbor nodes send a reply to sensor node $110^1$, which then initializes values for data associated with each of these neighbor nodes. As discussed above, the pheromone values are initialized to 1/t. For this example, a value of 2 is assigned to the reply time between sensor node $110^1$ and sensor node $110^2$, and a value of 4 is assigned for t between sensor node $110^1$ and sensor node $110^3$. Therefore, the pheromone values for these paths are initialized to 0.5 and 0.25, respectively. The aging factors are each initialized to 1. The contents of the data structure for sensor node $110^1$ with respect to interest $I_1$ at this stage is shown in table 2.

TABLE 2

| I | N | P | A |
|---|---|---|---|
| $I_1$ | $10^2$ | 0.5 | 1 |
|  | $10^3$ | 0.25 | 1 |

The next step in the propagation of the message is shown in FIG. 6B. Sensor nodes $110^2$ and $110^3$ now have received the message and replied to sensor node $110^1$. Each of these sensor nodes updates their node data structure accordingly.

Neither sensor node $110^2$ nor sensor node $110^3$ has initialized neighbor node data except data for the sender of the message. After analyzing the message and determining that it is a request that must be forwarded, each sensor node transmits the message to all neighbor nodes without transmitting the message back to sending node $110^1$. Sensor nodes $110^4$ and $110^5$ are neighbor nodes for sensor node $110^2$, and both receive the message from sensor node $110^2$. Only sensor node $110^5$ is a neighbor node for sensor node $110^3$, and it receives a message from both sensor node $110^2$ and sensor node $110^3$.

Sensor node $110^4$ will send a reply to sensor node $110^2$. Sensor node $110^5$ will send a reply to both sensor node $110^2$ and sensor node $110^3$. After this point, sensor node $110^5$ may forward each message separately or may forward only a single message on, depending on the configuration of the network, the sensors and the messages.

Having received replies from sensor nodes $110^4$ and $110^5$, sensor nodes $110^2$ and $110^3$ will update their node data structures. For the neighbor nodes of sensor node $110^2$, t is given a value of 3 for sensor node $110^4$ and 6 for sensor node $110^5$.

The path between sensor node 110³ and node 110⁵ is assigned a value for t of 4. Thus, the pheromone values are initialized to 0.33, 0.17 and 0.25, respectively. The aging factors are each initialized to 1.

Continuing to FIG. 6C, sensor nodes 110⁴ and 110⁵ each forward the message on to their neighbor nodes following the same steps. The only neighbor node for each is sensor node 110⁶, which receives messages 116 and sends a reply. As mentioned above, sensor node 110⁵ operates on both the messages it received. After updating its node data structure for the senders, sensor node 110⁵ treats the messages as a single message. Thus, sensor node 110⁶ receives only one message from sensor node 110⁵. In the embodiment described here sensor node 110⁶ will consider the messages as a single message after replying to sensor node 110⁴ and sensor node 110⁵ and updating the data in its node data structure. In another embodiment, Sensor node 110⁶ treats each of the two messages it receives as distinct.

Having received replies from sensor node 110⁶, sensor node 110⁴ and sensor node 110⁵ initialize a pheromone value and an aging factor. Assuming that the path from sensor node 110⁴ to sensor node 110⁶ has a value for t of 1, then the pheromone value would be initialized to 1. Assuming that the path from sensor node 110⁵ to sensor node 110⁶ has a value for t of 2, then the pheromone value for that path would be initialized in sensor node 110⁵ as 0.5. The aging factor will be initialized to 1 for each.

The request for information has now reached sensor node 110⁶, which has the requested sensor data. Sensor node 110⁶ is also referred to as a source node because it has the data requested by the sink node, and that data will flow from the source node to the sink node on the return path. The path of the message in returning to sensor node 110¹ is shown in FIGS. 7A and 7B.

Figure 7A:
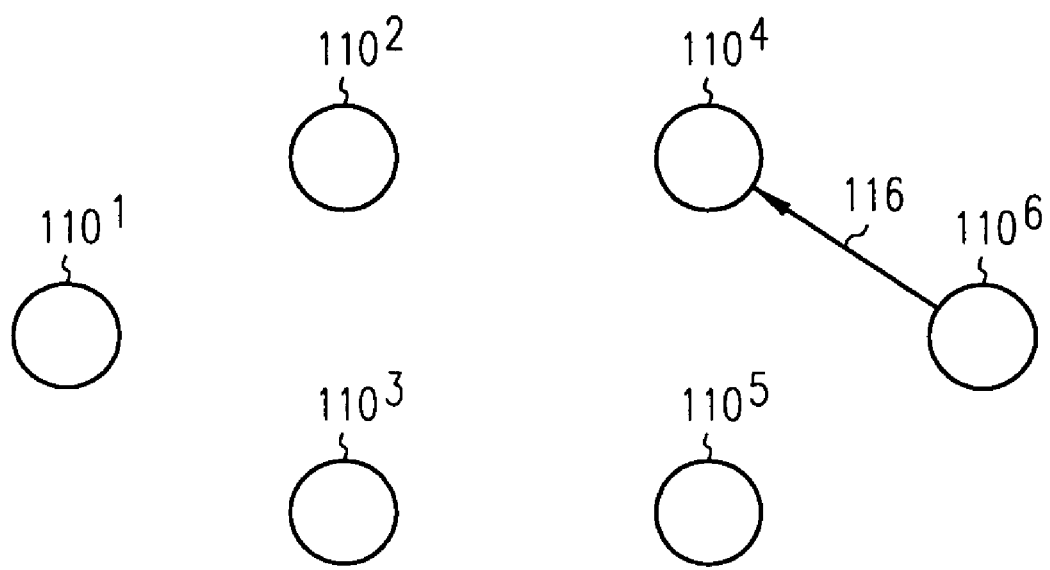
FIGS. 7A and 7B are illustrations of data returning through the network over an optimal path according to an example embodiment.
Figure 7B:
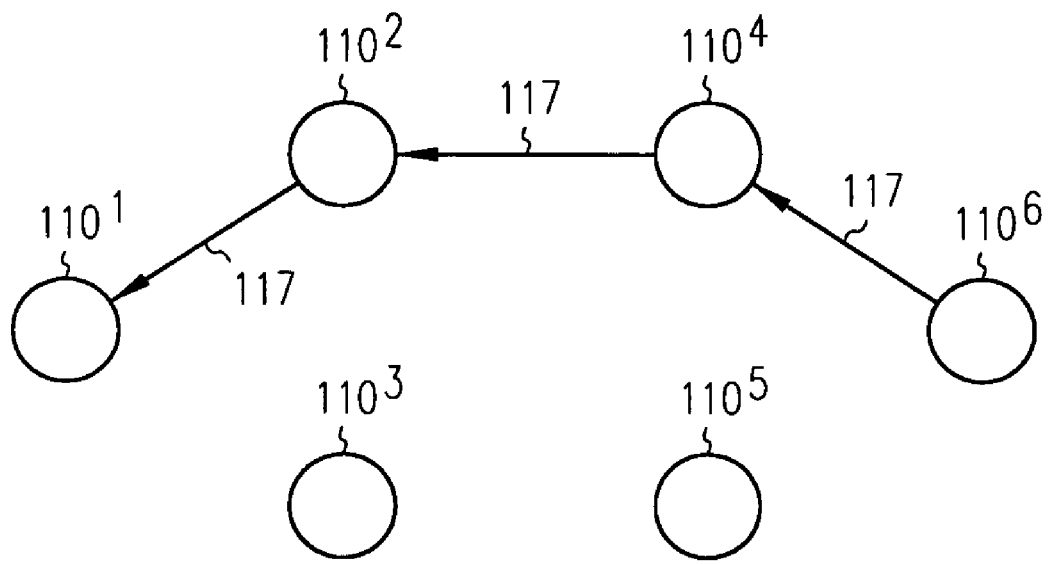

Looking at FIG. 7A, sensor node 110⁶ has already received the request for sensor data and updated its node data structure. Turning back to FIG. 4, the sensor node retrieves the requested data at block 421, and then returns the message at block 422. Though not diagrammed, returning the message is similar to forwarding the message as diagrammed in FIG. 5. The difference is that while forwarding a message involves sending the message to all except the neighbor node that sent the message to the sensor node, returning a message involves only looking at the data associated with the nodes that sent the message.

Here sensor nodes 110⁴ and 110⁵ sent a request to sensor node 110⁶. Sensor node 110⁶ compares the data it has for these neighbor nodes using the objective function described above in equation (2). Assuming that f(P)=P, while a and β each are set to 1, then the value of the objective function can be computed for each neighbor node. For sensor node 110⁴, the value of this function is 2. For sensor node 110⁵, the value of the function is 1.5. Thus, sensor node 110⁴ is the optimal path in this situation.

Sensor node 110⁶ transits a message 116 containing the requested sensor data to sensor node 110⁴. After receiving a reply sensor node 110⁶ updates the data associated with neighbor node 110⁴ for interest $I_1$ according to equation (1). Assuming that ρ=0.3, then the new pheromone value is 1.3. The aging factor is also incremented, so that the new value is 2. The updated node data structure for sensor node 110⁶ is displayed in table 3.

TABLE 3

| I | N | P | A |
|---|---|---|---|
| $I_1$ | 10⁴ | 1.3 | 2 |
|  | 10⁵ | 0.5 | 1 |

FIG. 7B shows the complete optimal path 117 found by this method for returning the message. Each sensor along the path updates its node data structure as it forwards the message on.

When the message reaches sensor node 110¹, the sensor recognizes that the information contained in the message was requested by the sensor. Thus, node 1 displays the message. Here displaying the information could comprise any use for the data, such as printing it on a monitor, feeding it as data into a computer program or activating some other indicator.

Figure 8:
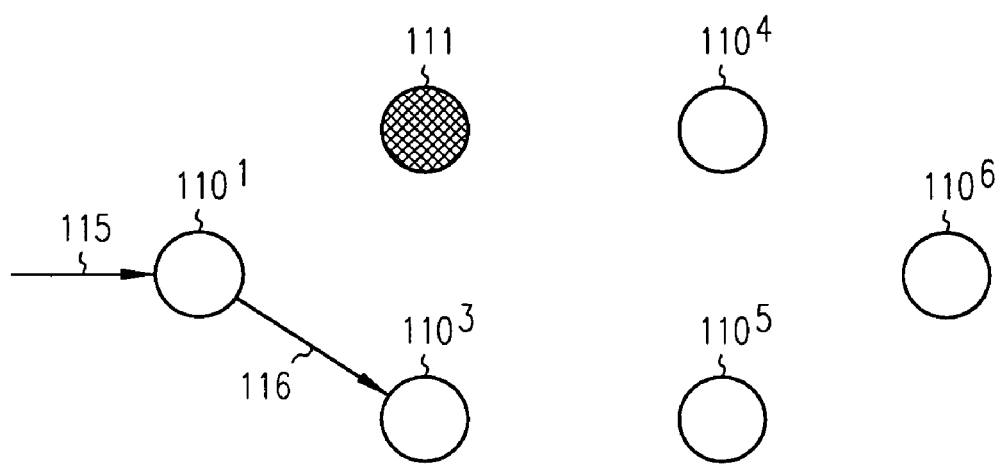
FIG. 8 is an illustration of a message in the network being routed around a failing node according to an example embodiment.

FIG. 8 shows a feature of one embodiment of the invention. Sensor node 110¹ periodically updates the pheromone values of its neighbor nodes by applying the evaporation function:

$$P_i = (1-\rho)f(t)P_i \qquad (3)$$

Here ρ is the evaporation constant and f(t) is a function of time. In one embodiment f(t) is a function such that the pheromone value decreases exponentially with time. By periodically decreasing the pheromone values, paths may be removed or used less frequently.

In FIG. 8, a sensor node 111 has failed or been removed from the network. Sensor node 110¹ receives a request 115. Having data associated with neighbor nodes 111 and 110³, sensor node 110¹ attempts to forward the message to node 111, but does not receive a reply as the sensor node is no longer active. This prompts sensor node 110¹ to resend the message to the next best path, here sensor node 110³. Sensor node 110¹ then increases the evaporation rate for sensor node 111. The pheromone value for sensor node 111 will decrease more rapidly than those associated with other nodes because of this. Sensor node 111 will eventually have a pheromone value of 0, and be erased from the node data structures of its neighbor nodes. In this way the system can adapt to the removal or failing of individual sensor nodes.

Figure 9:
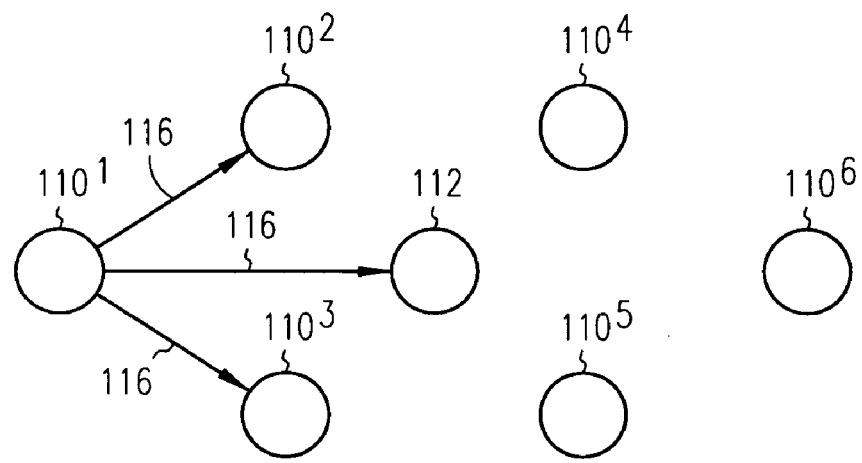
FIG. 9 is an illustration of a sensor node scanning for neighbor nodes according to an example embodiment.

FIG. 9 shows the network adapting to the addition of a new sensor node 112. Sensor node 110¹ is sending out a message 116. The message is sent periodically so that sensor node 110¹ can update its node data structure. In one embodiment the message is configured so that neighbor nodes reply to the message but do not forward it on. In one embodiment this is done by creating an interest in each node that causes each neighbor node to behave as though it has received a request for information available at that neighbor node. In that case each sensor node performs this step periodically. In another embodiment the message may be forwarded on through the network, with each sensor node similarly scanning all its neighbor nodes each time. In this case one or more than one node may be configured to periodically send this message.

The scan has the effect of updating the node data structure. It can be used to detect new nodes, such as sensor node 112. Here sensor node 112 is new and thus is being detected for the first time by sensor node 110¹. After receiving a reply from sensor node 112, sensor node 110¹ will add a tuple in its data structure for sensor node 112. The data may be added for a particular interest, or it may be added across each interest. Pheromone values are usually reinitialized for each neighbor node at this time, but they may remain unchanged. Aging factors remain unchanged in one embodiment. In another embodiment the aging factors of each neighbor node are reinitialized to 1. This feature allows the network to add components easily, and to prevent continual reinforcement of paths that may have become less efficient over time.

CONCLUSION

A system and method selects a path in a sensor network. In such networks, the value of distributing loads across different sensor nodes may be greater than the value of always using the path having the highest transfer rate. These factors may be weighted to maximize efficiency. This is accomplished by combining an ant-algorithm and a diet selection model from optimal foraging theory. The ant algorithm operates to find the path having the highest performance, while the diet selection model balances the performance of each path and the amount of use each sensor node receives in determining the optimal path.

In one embodiment, these operations are performed locally. Each sensor node stores a data structure containing the information needed to determine which other sensor node to transmit each message to.

Initially, no path data is stored in a sensor node. However, a data structure with pre-fed interests exists in the sensor node's memory. Each interest may represent a type of information such as sound or temperature, and possibly a location. When receiving a first message, there is no information with which to determine a best path. To find this information, the sensor node scans for neighbor nodes by broadcasting the message to all nodes connected to the sensor node. This scan returns a list of neighbor nodes. The sensor then initializes the data values, so that the data structure in the sensor node contains a list of interests with each interest being associated with a list of tuples. The tuples contain a neighbor node, its pheromone value, and its aging factor. The pheromone value is a passive object patch left in the sensor node by messages, its value depending on the quality of the path and the messages that have traveled the path. The aging factor represents utilization data measuring the activity a sensor node has received.

The next time the sensor node receives a message it will have data associated with each path. Using this data, the sensor node can determine the best path to forward the message along, rather than transmitting the message to each neighbor node. The best path is found by choosing a neighbor node that has a large pheromone value and a low aging factor. After choosing the path, the message is sent and the pheromone value and aging factor are updated. The aging factor is incremented and the pheromone value is increased based on a predetermined function. As more messages are sent, increasing the pheromone value will reinforce a path. At the same time, the increasing aging factor will negatively reinforce the path. These factors are balanced by the objective function, which may be customized to particular network properties.

Periodic updates of the data stored in each sensor node may also be used. For example, each sensor node may periodically update all pheromone values. This allows for the removal of paths that are no longer used. Another periodic function that may be useful is scanning for neighbor nodes. A sensor may use this to re-initialize pheromone values and also reaffirm or change neighbor nodes. Using these two functions, changing network topologies may be handled. If a sensor node is removed from the system the pheromone value for that node will quickly evaporate in its neighbor nodes, and they will route paths around the node. If a sensor is added to the network, a periodic scan will detect it and neighbor nodes will quickly add the new sensor to their data structure.

The invention is described as used in a sensor network. However, it will be understood that the present invention is useful in any node based network where path selection could be used to improve data transfer rates and node life is related to use. Such a network could be a communication network in which the nodes do not detect any events, but only transfer messages.

The Abstract is provided to comply with 37 C.F.R. § 1.72 (b) to allow the reader to quickly ascertain the nature and gist of the technical disclosure. The Abstract is submitted with the understanding that it will not be used to interpret or limit the scope or meaning of the claims.

The invention claimed is:

1. A computerized method executed by a processor in a network comprising:
    receiving a message at the processor;
    updating a pheromone value and an aging factor associated with the message via the processor; and
    transmitting the message from the processor;
    wherein the pheromone value is updated by the function $P_i=(1+\rho)P_i$;
    $P_i$ is the pheromone value; and
    $\rho$ is a constant; and
    wherein the transmitting includes determining a destination to transmit the message using an objective function comprising $$\alpha f(P) + \beta \frac{1}{A};$$

$\alpha$ and $\beta$ are constants;
   f(P) is a function of the pheromone value; and
   A is the aging factor;
   wherein $\alpha$, $\beta$, and f(P) are not equal to zero.

2. The method of claim 1 wherein the message includes a request for sensor data.

3. The method of claim 1 wherein the message includes sensor data.

4. The method of claim 1 wherein updating includes initializing the pheromone value and the aging factor and associating them with a source of the message.

5. The method of claim 1 wherein the pheromone value and the aging factor are associated with a source of the message.

6. The method of claim 1 wherein the pheromone value and the aging factor are associated with a source of the message in a tuple containing the source of the message, the pheromone value and the aging factor.

7. The method of claim 6 wherein the tuple is contained in a list of at least one tuple associated with an interest.

8. The method of claim 1 further comprising:
    decreasing the pheromone value at periodic intervals.

9. The method of claim 8 wherein the pheromone value is decreased by the function $P_i=(1-\rho)P_i f(t)$;
    $P_i$ is the pheromone value;
    $\rho$ is a constant; and
    f(t) is a function of time.

10. The method of claim 1 wherein transmitting includes determining a destination to transmit the message.

11. The method of claim 1 further comprising:
    updating at least one additional pheromone value and at least one additional aging factor after transmitting the message.

12. The method of claim 11 wherein the at least one additional pheromone value and the at least one additional aging factor are associated with at least one destination of the message.

13. The method of claim 1 further comprising:
modifying the message before transmitting the message.

14. The method of claim 13 further comprising:
obtaining sensor data before modifying the message; and
modifying the message includes adding the sensor data to the message.

15. A method implemented by a node in a network of nodes for organizing the network, the method comprising:
scanning for at least one neighbor node; and
updating at least one pheromone value and at least one aging factor associated with the scanned at least one neighbor node;
wherein the pheromone value is updated by the function $P_i=(1+\rho)P_i$;
$P_i$ is the pheromone value; and
$\rho$ is a constant; and
wherein the transmitting includes determining a destination to transmit a message using an objective function comprising $$\alpha f(P) + \beta \frac{1}{A};$$

$\alpha$ and $\beta$ are constants;
f(P) is a function of the pheromone value; and
A is the aging factor;
wherein $\alpha$, $\beta$, and f(P) are not equal to zero.

16. A node comprising:
means for storing at least one pheromone value and at least one aging factor;
means for updating the at least one pheromone value and the at least one aging factor;
means for receiving a message; and
means for transmitting the message;
wherein the means for updating the at least one pheromone value comprises the function $P_i=(1+\rho)P_i$;
$P_i$ is the pheromone value; and
$\rho$ is a constant; and
wherein the transmitting includes determining a destination to transmit the message using an objective function comprising $$\alpha f(P) + \beta \frac{1}{A};$$

$\alpha$ and $\beta$ are constants;
f(P) is a function of the pheromone value; and
A is the aging factor;
wherein $\alpha$, $\beta$, and f(P) are not equal to zero.

17. The node of claim 16 wherein the message includes a request for sensor data.

18. The node of claim 16 wherein the message includes sensor data.

19. The node of claim 16 further comprising:
means for sensing at least one event; and
means for modifying the message to include the at least one sensed event.

20. The node of claim 16 wherein the means for storing the at least one pheromone value and at least one aging factor includes a node data structure having a list of at least one interest;
each of the at least one interests is associated with a list of tuples, the list of tuples either being empty or containing at least one tuple; and
each of the at least one tuples contains a neighbor node, one of the at least one pheromone values and one of the at least one aging factors.

21. The node of claim 16 further comprising:
means for determining a destination to transmit the message.

22. The node of claim 21 wherein determining the destination includes selecting the destination based on the at least one pheromone value and the at least one aging factor.

23. The node of claim 16 further comprising:
means for scanning for at least one neighbor node at periodic intervals; and
means for updating the at least one pheromone value and the at least one aging factor based on the at least one neighbor node.

24. The node of claim 16 further comprising:
means for decreasing the at least one pheromone value at periodic intervals.

25. The node of claim 24 wherein decreasing the at least one pheromone value includes decreasing each of the at least one pheromone values according to the function $P_i=(1-\rho)P_i f(t)$;
$P_i$ is the at least one pheromone value;
$\rho$ is a constant; and
f(t) is a function of time.

26. A node comprising:
a computer-readable storage device for storing at least one pheromone value and at least one aging factor;
a processor configured to update the at least one pheromone value and the at least one aging factor;
a first port for receiving a message; and
a second port for transmitting the message;
wherein the processor for updating the at least one pheromone value includes the function $P_i=(1+\rho)P_i$;
$P_i$ is the pheromone value; and
$\rho$ is a constant; and
wherein the transmitting includes determining a destination to transmit the message using an objective function comprising $$\alpha f(P) + \beta \frac{1}{A};$$

$\alpha$ and $\beta$ are constants;
f(P) is a function of the pheromone value; and
A is the aging factor;
wherein $\alpha$, $\beta$, and f(P) are not equal to zero.

27. The node of claim 26 wherein the message includes a request for sensor data.

28. The node of claim 26 wherein the message includes sensor data.

29. The node of claim 26 further comprising:
a sensor for detecting an event.

30. The node of claim 29 further comprising:
a processor coupled to the sensor, input port and output port, such that the processor can modify the message to include the detected event.

31. The node of claim 26 wherein the at least one pheromone value and the at least one aging factor are stored in a node data structure within the computer-readable storage device having a list of at least one interest;
- each of the at least one interests is associated with a list of tuples, the list of tuples either being empty or containing at least one tuple; and
- each of the at least one tuples contains a neighbor node, one of the at least one pheromone values and one of the at least one aging factors.

32. The node of claim 26 further comprising:
- a processor connected to the computer-readable storage device, the first port and the second port, such that the processor can determine a destination for the transmitted message based on the at least one pheromone value and the at least one aging factor.

33. The node of claim 32 wherein the processor can decrease the at least one pheromone value at periodic intervals.

34. The node of claim 33 wherein decreasing includes applying the function $P_i=(1-\rho)P_i f(t)$;
- $P_i$ is the at least one pheromone value;
- $\rho$ is a constant; and
- $f(t)$ is a function of time.

35. The node of claim 32 wherein the transmitted message is formatted by the processor to include a scan for at least one neighbor node at periodic intervals.

36. A sensor node for use in a self-organizing node network that is organized to balance speed and efficiency of data transfer with network life, the sensor node comprising:
- an input port;
- an output port;
- a processor;
- at least one sensor;
- a computer-readable storage device;
- a node data structure contained in the computer-readable storage device;
- the processor coupled to the input port and the computer-readable storage device, such that the processor can analyze a message received through the input port and update at least one pheromone value and at least one aging factor stored in the node data structure based on the message,
- wherein the pheromone value is updated by the function $P_i=(1+\rho)P_i$;
- $P_i$ is the pheromone value; and
- $\rho$ is a constant; and
- wherein the transmitting includes determining a destination to transmit the message using an objective function comprising $$\alpha f(P) + \beta \frac{1}{A};$$

- $\alpha$ and $\beta$ are constants;
- $f(P)$ is a function of the pheromone value; and
- $A$ is the aging factor;
- wherein $\alpha$, $\beta$, and $f(P)$ are not equal to zero;
- the processor coupled to the output port, such that the processor can transmit the message on to at least one neighbor node in the node network and update at least one pheromone value and at least one aging factor stored in the node data structure based on the at least one neighbor node; and
- the processor coupled to the at least one sensor, such that the processor can modify the message with sensor data collected from the at least one sensor.

* * * * *